Jan. 13, 1970   R. CRIBLEZ   3,489,021
TRANSMISSIONS

Filed March 27, 1968   2 Sheets-Sheet 1

INVENTOR
ROGER CRIBLEZ

BY *Wenderoth, Lind & Ponack*
ATTORNEYS

Jan. 13, 1970  R. CRIBLEZ  3,489,021
TRANSMISSIONS
Filed March 27, 1968  2 Sheets-Sheet 2

INVENTOR
ROGER CRIBLEZ

BY *Wenderoth, Lind & Ponack*
ATTORNEYS

United States Patent Office 3,489,021
Patented Jan. 13, 1970

3,489,021
TRANSMISSIONS
Roger Criblez, Riehen, Switzerland, assignor to F. B. Hatebur A.G., Basel, Switzerland, a Swiss company
Filed Mar. 27, 1968, Ser. No. 716,464
Claims priority, application Switzerland, Mar. 29, 1967, 6,704,472
Int. Cl. F16h 21/32, 21/18, 25/08
U.S. Cl. 74—40                                7 Claims

ABSTRACT OF THE DISCLOSURE

The invention relates to a transmission for driving both the ram of a crank press and the press carriage ejector in synchronism. The transmission comprises a crank mechanism which drives the ram and a second crank mechanism which drives a cam which engages the press carriage ejector, the two crank mechanisms being coupled for movement in synchronism.

---

Figure 1:
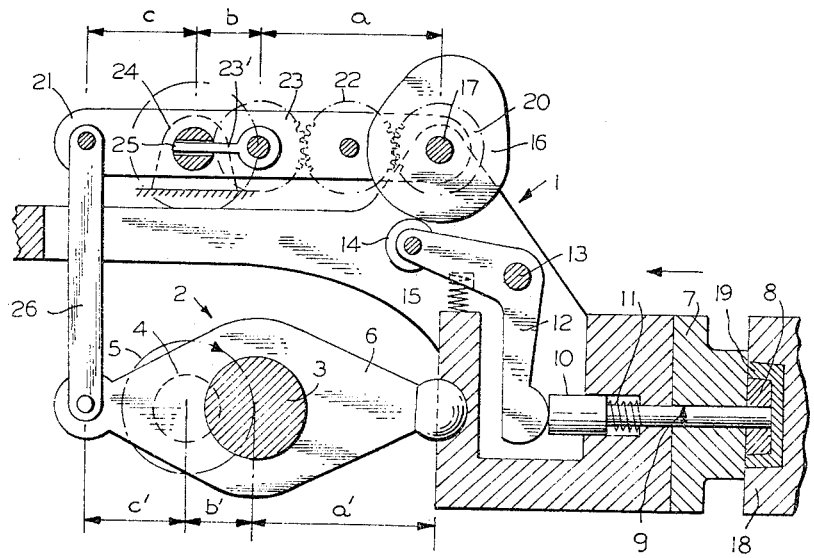

The present invention relates to a transmission, and more especially to a transmission for operating a crank press.

It has been found necessary in crank presses to employ a transmission which will control the operation of the ejector in precise time dependence on the reciprocating movement of the press carriage.

In a known arrangement for the control of press carriage ejectors there is arranged in the immediate vicinity of the press carriage a stationary control shoe against which the ejector impinges at the reciprocating movement of the carriage. However, this arrangement has the disadvantage that the ejector is necessarily not only operated on the return travel but also on the forward travel of the carriage, which in most cases is undesirable.

It has been attempted to obviate this disadvantage by connecting the ejector control element arranged at the carriage by means of pivotable connecting elements to the crank mechanism, in order in this way to operate the control element in direct dependence on the crank shaft movement. The control element, which can be constructed for example in the form of a control cam, carries out an oscillatory movement which, however, can only be used in the central region of the pivoting angle for the satisfactory operation of the ejector. The design and setting of such a control cam, operating with continually varying angular velocity, is relatively complicated also.

The apparatus which is the subject of the present invention reduces or overcomes these disadvantages.

According to the present invention there is provided a transmission comprising a first crank mechanism having a first connecting rod for reciprocating a machine part, and a second crank mechanism having a crank radius equal to the crank radius of the first crank mechanism and being coupled to the first crank mechanism with its axis of rotation arranged parallel with the axis of rotation of the first crank mechanism, the second crank mechanism including a second connecting rod equal in length to the first connecting rod for rotating an auxiliary machine part in synchronism with movement of the first machine part and being adapted to pivot about the axis of rotation of the auxiliary machine part, a crank pin located on the second connecting rod, a planet gear fixedly mounted on the crank pin, at least one intermediate gear mounted on the second connecting rod and drivably engaged by the planet gear whereby for each revolution of the second crank mechanism the planet gear rolls once on the periphery of the intermediate gear, and a driven gear rotatable with the auxiliary machine part, a driving connection being provided between the intermediate gear and the driven gear whereby the driven gear is rotatable in synchronism with the planet gear.

Such a transmission ensures that the auxiliary member to be driven also carries out one precise revolution at each revolution of the main crank mechanism. The auxiliary elements to be operated, e.g. ejectors, can be operated in dependence on the rotary movement of the auxiliary member at any selectable instant, for example by appropriately shaped cam discs.

Figure 2:
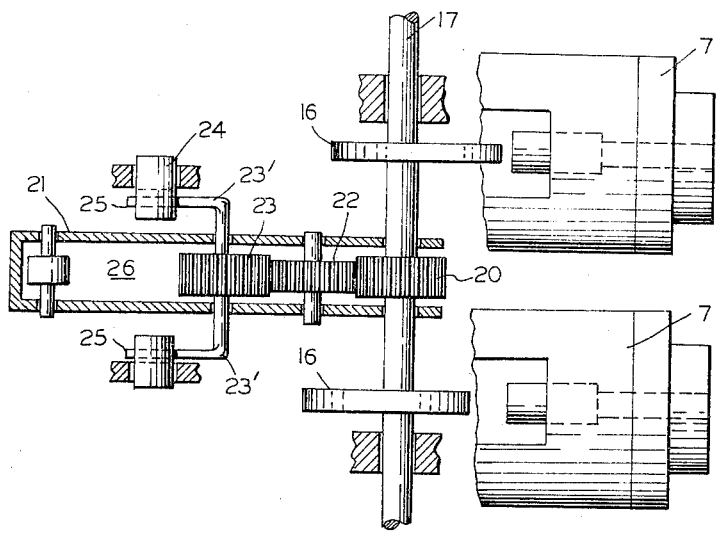
Figure 3:
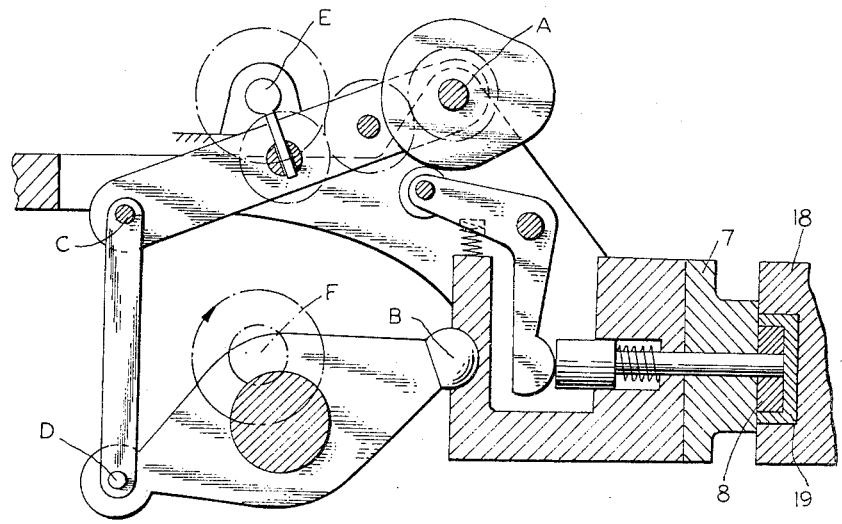
Figure 4:
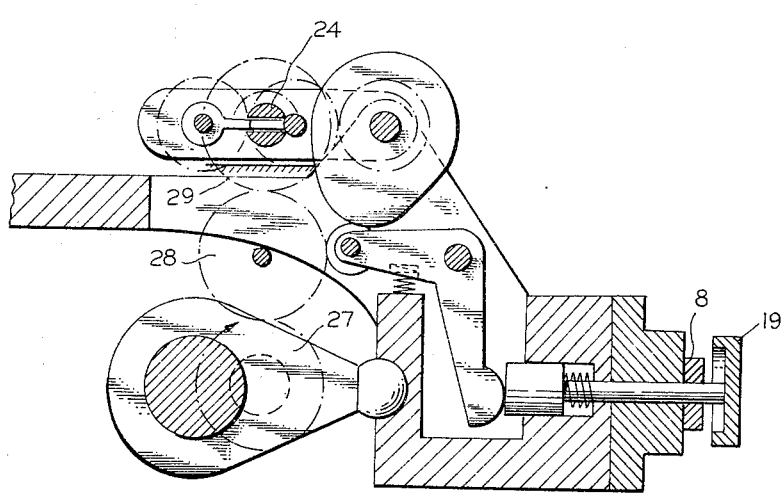

Illustrative embodiments of the invention will now be described with reference to the accompanying drawings, in which:

FIGURE 1 shows a diagrammatic elevational view of a crank-operated press carriage at the dead centre at the end of the deforming operation, FIGURE 2 is a diagrammatic plan view onto the press carriage according to FIGURE 1, FIGURES 3 and 4 show constructional variants of the press carriage according to FIGURE 1, the main crank mechanism having been turned onwards by a specific crank angle in each case.

FIGURES 1 and 2 show a press carriage 1 which is coupled to a main crank mechanism 2 and is adapted to reciprocate as indicated by the arrows.

The main crank mechanism 2 comprises a crank pin 3 which describes a crank circle 5 about the axis of a crank shaft 4 and is coupled to the press carriage 1 by a connecting rod 6. Located on the press carriage 1 is a press ram holder 7 having a press ram 8 attached to the end face thereof. An ejector pin 10 is mounted to be axially displaceable in a bore 9 which extends through both the press carriage body and the ram holder and the ram itself. The ejector pin 10 is held in contact always with the lower portion of a bell-crank lever 12 by a compression spring 11. This bell-crank lever is pivotably mounted at 13 on the press carriage superstructure and comprises at its upper end a free roller 14 which is pressed continually against the periphery of a cam disc 16 by a compression spring 15. The cam disc 16 itself is fixed on a control shaft 17 for rotation therewith. When the control shaft 17 rotates, the bell-crank lever 12 is pivoted about the axis 13 in dependence on the contours of the cam disc 16, and thus imparts to the ejector pin 10 a movement in the direction of its longitudinal axis.

In the position shown in FIGURE 1, the ram 8 at the end of a pressing operation projects into the opposite bore of a die 18 in which the deformed pressed product 19 is still situated. From this position, the ram 8 then moves in the arrowed direction out of the die, the pressed product, it is found, remains adhered to the ram and has to be stripped from the ram by a relative movement between ram 8 and ejector pin 10 (FIGURE 4). Therefore, this relative movement must take place at a predetermined time in dependence on the reciprocating movement of the press carriage. As will be apparent from the foregoing description, it is derived from the control shaft 17.

The control shaft 17 extends over the entire width of the press carriage 1 and is mounted to be freely rotatable therein. As shown in FIGURE 2, a multi-stage press is provided wherein the pressed product is subjected to a plurality of successive pressing operations and is transported from tool to tool by transverse conveying tongs; therefore, each ejector 10 is provided with its own cam disc 16 on the control shaft 17. A gearwheel 20 is also fixedly mounted on the control shaft 17, preferably centrally thereof. At both sides of the gearwheel 20 there is freely mounted on the control shaft 17 one end of an oscillatory frame 21. The oscillatory frame 21 is adapted to rotate about the axis of the control shaft 17. Two gearwheels 22 and 23 are arranged in the oscillatory frame 21. The gearwheel 23 which will be referred to hereinafter as a planet wheel, corresponds in tooth spacing and diameter precisely to the gearwheel 20 and is arranged at a distance $a$ therefrom which corresponds precisely to the theoretical length $b$ of the connecting rod 6. The hub of the planet wheel 23 is connected rigidly to two crank arms 23' extending on both sides of the planet wheel 23, the side arms engaging in a stationary bearing 24. The bearing 24, which in a very simple form of embodiment comprises two through bores 25 serving to accommodate the crank arms 23', is rotatable about its axis which is situated in FIGURE 1 at right angles to the drawing plane so that the planet wheel 23 projecting with the crank arms 23' into the bearing bores 25 can also carry out a rotational movement about the aforesaid bearing axis, and owing to its rigid connection with the crank arms 23' it always turns the same side to the bearing 24. The spacing $b$ between the axis of the planet wheel 23 and that of the bearing 24 corresponds precisely to the crank radius $b'$ of the main crank mechanism 2.

The gearwheel 22 is mounted to be freely rotatable in the oscillatory frame 21, and preferably corresponds as regards its diameter to the gearwheels 22 and 23 and is in engagement therewith.

The oscillatory frame may, optionally, extend beyond the bearing 24 by an amount $c$. The connecting rod 6 of the main crank mechanism 2 has a corresponding rearward extension having a length $c'$ which corresponds precisely to the length of extension $c$. The free end of the oscillatory frame 21 is connected pivotably to the end of the connecting rod extension by a coupling rod 26.

The apparatus described operates in the following manner: a rotational movement of the crank shaft 4 in the clockwise sense (arrow in FIGURE 1) returns the ram 8 from the die 18. But at the same time the movement of the connecting rod 6 is transmitted by the coupling rod 26 to the oscillatory frame 21 so that the oscillatory frame participates in the reciprocating movement of the press carriage by means of the control shaft 17, and carries out a movement which is parallel to that of the connecting rod 6. The movement of the oscillatory frame 21 causes the planet wheel 23, to describe a circle about the axis of the bearing 24 (see FIGURE 3). However, since the planet wheel 23 is always in engagement with the intermediate wheel 22, it rolls once over the periphery thereof with each revolution. The object aimed at, i.e. the true-angle driving of the control shaft 17 in dependence on the crank shaft 4, is thus achieved.

According to FIGURE 3, the crank shaft 4 is rotated through a specific angle relatively to FIGURE 1. The axes designated as A–B–E–F which form a rectangle in the illustrated elevation, have retained their positions relatively to one another and have merely been shifted towards the left. The positions of the axes A–B–C–D relatively to one another, on the other hand, have changed since the original rectangle has now become a parallelogram. Since the six axes A, B, C, D, E, F are connected to one another by the intermediate elements described hereinbefore, the movement of the system could cause the two axis systems A, B, C, D and A, B, E, F to jam. This risk is eliminated by the arrangement described hereinafter.

In order to counteract the risk of jamming, play must be provided at least at one point in the moved system in order to permit a compensating displacement of the interconnected elements relatively to one another. This can be achieved for example by not fixing the crank arms 23' of the planet wheel 23 in the bores 25 of the bearing 24 but arranging them to be axially displaceable with play. It would also be readily possible to provide the hub of the planet wheel 23 with two bores and to make two crank arms which are mounted on the axis E and are rotatable about the axis project with play into the bores. Such an arrangement is shown diagrammatically in FIGURE 3.

As can be seen from the illustration, the elements 21, 23 and 23' in each case form an auxiliary crank mechanism which is arranged in parallel arrangement relatively to the main crank mechanism 2 and always retains this parallel position. The arms 23' form the cranks, the gearwheel hub the crank pin and the oscillatory frame 21 the connecting rod of the auxiliary crank mechanism.

In the example of embodiment shown in FIGURES 1 to 3, the transmission of movement from the main crank mechanism 2 to the oscillatory frame 21 is effected through the coupling rod 26 which connects pivotally to the extensions of the two connecting rods i.e. the connecting rod 6 and the oscillatory frame 21. A further possibility of transmitting movement is shown in FIGURE 4. In this arrangement a gearwheel 27 is arranged on the crank shaft 4 for rotation therewith and which gearwheel meshes with an intermediate wheel 28 mounted to be freely rotatable on the stationary machine frame. The intermediate wheel 28 is itself in engagement with a gearwheel 29 which is connected for rotation with the rotatable bearing 24 or an extension thereof. Thus the rotary movement of the crank shaft 4 is transmitted by way of the intermediate wheel 28 and the gear wheel 29 to the bearing 24, which rotates the planet wheel 23 by way of the crank arms 23'. The wheels 27, 28 and 29 preferably have the same diameter and the same tooth pitch.

As can be shown geometrically, the desired true-angle transmission of the rotary movement of the main crank mechanism 2 to the control shaft 17 can only be achieved if the three gearwheels 20, 22 and 23 are identical in size. However, a slight deviation can be allowed at the intermediate wheel 22, depending on the degree of precision which is to be achieved.

I claim:
1. Transmission apparatus for driving a machine comprising a machine part, an auxiliary machine part, a first crank mechanism having a first connecting rod for reciprocating said machine part and a drive for driving said auxiliary machine part in synchronism with the movement of said first machine part, said drive comprising a second crank mechanism having a crank radius equal to the crank radius of said first crank mechanism and being coupled to said first crank mechanism with its axis of rotation parallel to the axis of rotation of said first crank mechanism, said second crank mechanism comprising a second connecting rod equal in length to said first connecting rod for rotating said auxiliary machine part about an axis of rotation, said second connecting rod being pivotable about said axis of said auxiliary machine part, crank pin means mounted on said second connecting rod, planet gear means fixedly mounted on said crank pin means, intermediate gear means mounted on said second connecting rod and drivably engaged by said planet gear means whereby for each revolution of said second crank mechanism said planet gear means rolls once on the periphery of said intermediate gear means, a driven gear means rotatable with said auxiliary machine part, and a driving connection provided between said intermediate gear means and said driven gear means whereby said driven gear means is rotatable in synchronism with said planet gear means.

2. The transmission according to claim 1 in which said driven gear means is of a diameter equal to the diameter of the said planet gear means and directly engages the intermedaite gear means.

3. The transmission according to claim 1 in which the said first and second connecting rods include extensions, the said first and second crank mechanisms being coupled via said extensions.

4. The transmission according to claim 3 in which the said second crank mechanism includes a crank arm and a bearing supporting said crank arm, said crank arm arranged for limited axial movement transversely of the axis of rotation of said bearing.

5. The transmission according to claim 1 which comprises a toothed-wheel gear arrangement for driving the said crank pin of the said second crank mechanism.

6. The transmission according to claim 1 in which the said planet gear means, the said intermediate gear means and the said driven gear means all have equal diameters.

7. The transmission according to claim 1 incorporated in a crank press having a press die with a ram, a press carriage ejector and a cam for actuating said ejector, the first connecting rod reciprocating the ram of the press die and the second connecting rod rotating said cam.

References Cited

UNITED STATES PATENTS

| | | | |
|---|---|---|---|
| 1,382,316 | 6/1921 | Poage | 74—40 |
| 2,770,203 | 11/1956 | Ooms | 74—40 |
| 3,264,886 | 8/1966 | Marty | 74—40 |

FRED C. MATTERN, JR., Primary Examiner

W. S. RATLIFF, JR., Assistant Examiner

U.S. Cl. X.R.

74—22, 43